United States Patent [19]

Okato et al.

[11] Patent Number: 5,532,460
[45] Date of Patent: Jul. 2, 1996

[54] INDUCTION COOKWARE FORMED OF TITANIUM ALLOY AND METHOD OF MAKING SAME

[75] Inventors: Nobuyoshi Okato; Tatsuo Katagiri, both of Kawasaki; Kuniaki Osada, Yokohama; Keiji Shirakawa, Kanazawa, all of Japan

[73] Assignee: Nippon Yakin Kogyo Co., Ltd., Tokyo, Japan

[21] Appl. No.: 381,963

[22] PCT Filed: Jun. 14, 1994

[86] PCT No.: PCT/JP94/00959

§ 371 Date: Feb. 14, 1995

§ 102(e) Date: Feb. 14, 1995

[87] PCT Pub. No.: WO94/30031

PCT Pub. Date: Dec. 22, 1994

[30] Foreign Application Priority Data

Jun. 16, 1993 [JP] Japan .................... 5-145235
Jun. 17, 1993 [JP] Japan .................... 5-146539
May 31, 1994 [JP] Japan .................... 6-119040

[51] Int. Cl.$^6$ ........................................ H05B 6/12
[52] U.S. Cl. .............. 219/621; 126/390; 99/DIG. 14; 264/239
[58] Field of Search .................. 219/621, 622, 219/620, 625; 126/390; 99/DIG. 14; 264/239, 241

[56] References Cited

U.S. PATENT DOCUMENTS 3,684,853 8/1972 Welch et al. .................. 219/621
3,777,094 12/1973 Peters, Jr. .................... 219/621
4,428,773 1/1984 Krotz ............................ 75/117
5,141,985 8/1992 Asai et al. ..................... 524/497

FOREIGN PATENT DOCUMENTS 0380306 8/1990 European Pat. Off. .
2437184 4/1980 France .
1107716 4/1989 Japan .
4030817 2/1992 Japan .
2034173 6/1980 United Kingdom .
92/00032 1/1992 WIPO .

OTHER PUBLICATIONS

Nikkei New Materials, Mar. 18, 1991, pp. 20–21.

Primary Examiner—Philip H. Leung
Attorney, Agent, or Firm—Oliff & Berridge

[57] ABSTRACT

An electromagnetic cooking container includes a non-magnetic titanium alloy plate having a specific resistivity not less than $80\times10^{-6}$ Ω·cm and not more than $200\times10^{-6}$ Ω·cm. The titanium alloy plate includes a titanium alloy layer, a plurality of laminated titanium alloy layers, or a plurality of kinds of titanium alloy layers. The titanium alloy plate is formed into the desired shape by a superplastic blow forming method in which the titanium alloy plate is forced on a surface of a mold or die by a gas pressure at a forming temperature not less than 500° C. The container may further include a titanium oxide film formed on an inner cooking surface of the formed titanium alloy plate. Heat generation by electromagnetic induction is enabled and there are no problems of deformation, rust, or weight addition.

17 Claims, No Drawings

INDUCTION COOKWARE FORMED OF TITANIUM ALLOY AND METHOD OF MAKING SAME

TECHNICAL FIELD

The present invention relates to a heating container heated by electromagnetic induction and further to a container for an electromagnetic cooking device, in particular, relates to an electromagnetic cooking device container, comprising titanium alloy, which can be formed by hot forming or superplastic forming, and relates to a manufacturing method thereof.

BACKGROUND ART

Recently, electromagnetic cooking devices using electromagnetic induction as an energy source have been widely utilized for both business service and home appliances in stead of gas cooking stoves. A heating principle of such an electromagnetic cooling device is such that an induction coil is provided underneath a plate on which cooking containers such as pans, pots, and cooking skillets are placed, an alternating magnetic field generated by such induction coil produces eddy current in the cooking container, then the eddy current flow in the container results in generating heat depending on a specific impedance of material constituting the cooking container.

As described above, it has been conventionally considered that generation of the eddy current in the cooking container by means of the alternating magnetic field requires a magnetic material such as stainless steel, steel or the like (see, Nikkei New Materials, dated Mar. 18, 1991, p.20) for that material of the container.

Therefore, the containers for electromagnetic cooking devices such as pans, pots, and cooking skillets have generally been made of iron metal, or made of clad metal which is superposed with two or more different kinds of metals, for example, stainless steel and aluminum alloy etc.

However in the container made of materials as in the above, the inventors of the present invention has found problems in that, with iron container used, the cooking repeated with heating and cooling in the extremely strong magnetic field disadvantageously provides deformation in such container due to produced magnetostriction, and in addition, tends to cause rust, and makes more weighty.

In the container made of the clad metal, repeat of heating and cooking through the use produces difference of thermal expansion and magnetostriction between the different kinds of metals which are superposed each other, this results in more weight in addition to peeling on bonding of those different kinds of metals.

Furthermore, a unitary bonding of different kinds of metals requires higher costs for scrapping process in addition to a complicated and therefore expensive manufacturing process.

A drawback is that austenite stainless steel arranged on inside surface of the container which contacts with meat or vegetable or the like on cooking tends to scorch and stick to the inside surface of the container.

The present invention has been developed for solving the problems described above. An object of the invention is to provide a container for an electromagnetic cooking device which is easy to handle with light weight and exhibits a high heating-efficiency due to electromagnetic induction and a graded corrosion-resistance without peeling on bonding surface between the different kinds of metals and without deformation even in the repeat use.

Another object of the invention is to provide a method of manufacturing a container of an electromagnetic cooking device which is capable of easily manufacturing the electromagnetic cooking device container having the characteristics as hereinbefore described.

DISCLOSURE OF THE INVENTION

In order to achieve the object described above, the present inventors have paid an attention to titanium alloy of a larger specific resistance having a higher specific strength with a graded corrosion-resistance as a material of the container and has intensively researched and studied its practicality. As a result of such research and study, it has been found that composition of titanium alloy is adjusted to produce a suitably larger specific resistance value and to enable heat generation by electromagnetic induction as in magnetic materials in spite of non-magnetic material, and that a surface (cooking surface) is covered by its oxide to prevent scorch and stick to the inside of the container on cooking.

It is impossible to treat the titanium alloy by means of ordinary cold treatment because the titanium alloy has a considerably higher strength when placed at a room temperature. However, the titanium alloy is found to be formed easily into a desired shape according to the hot forming otherwise the superplastic forming which utilizes superplastic phenomenon that can be seen in titanium alloys.

The present invention has been made in accordance with such knowledge and intention, and is constructed in that, the container comprises a single titanium alloy layer, or two or more laminated layers of one kind titanium alloy or two or more kinds of titanium alloys, on the most part of the container forming a vessel shape, and each specific resistance value of the titanium alloys is equal to or more than $80 \times 10^{-6}$ $\Omega \cdot$cm and equal to or less than $200 \times 10^{-6}$ $\Omega \cdot$cm.

The present invention is constructed in that, the container comprises a single titanium alloy layer, or two or more laminated layers of one kind titanium alloy or two or more kinds of titanium alloys, on a part of the container forming a vessel shape, from an outside surface to an inside surface, and each specific resistance value of the titanium alloys is equal to or more than $80 \times 10^{-6}$ $\Omega \cdot$cm and equal to or less than $200 \times 10^{-6}$ $\Omega \cdot$cm.

In such aspect of the present invention, the inside surface of a portion, which comprises titanium alloy, of the container may be coated with a titanium oxide film.

Moreover, the present invention is to provide that, for forming the container described above, one sheet of titanium alloy plate or a titanium alloy plate superposed of two or more sheets of titanium alloy plates is formed into a desired shape at a forming temperature equal to or higher than 500° C. by means of hot forming or superplastic forming.

All of the specific resistance values of titanium alloys described in this specification are the values at an ordinary temperature (room temperature).

Generally, it is known that the specific resistance value varies depending on temperature. Therefore, it is understood that, when the specific resistance of the titanium alloys shows a value within the range defined in accordance with the present invention at a room temperature, such specific resistance value is deemed to be included in the present invention even if the specific resistance departs, at a temperature other than the room temperature, from the scope defined in accordance with the present invention.

The reason why a specific resistance value equal to or more than $80\times10^{-6}$ $\Omega\cdot$cm is given to the titanium alloy is in that, although it is difficult to heat pure titanium (Ti) having a specific resistance of an extent of $50\times10^{-6}$ $\Omega\cdot$cm by means of electromagnetic induction, here when converting into an alloy by adding aluminum and the like on pure titanium, the specific resistance value becomes larger, thus obtained higher specific resistance value becomes equal to or more than $80\times10^{-6}$ $\Omega\cdot$cm, then a sufficient heating (calorific) value for cooking is obtained by the electromagnetic induction.

The reason why a specific resistance value equal to or less than $200\times10^{-6}$ $\Omega\cdot$cm is given to the titanium alloy is that an upper limit of the specific resistance value of the titanium alloy easily available in the industrial field at the present time is equal to $200\times10^{-6}$ $\Omega\cdot$cm. However in the container of the electromagnetic cooking device, basically, a larger specific resistance value provides a more heating value, hence the titanium alloy having a specific resistance value exceeding an upper limit defined in accordance with the present invention may preferably be used without problem.

A forming temperature thereof is made equal to or more than 500° C. because a strength (that is, a flow stress) of the titanium alloy in such temperature region becomes smaller, hence, shapes of the pan or cooking skillet or wok or the like are easily formed by the hot forming such as hot forming or by superplastic forming preferably under the condition of vacuum or inert atmosphere. In case where a container comprises a plurality of laminated titanium alloy layers, the reason why a temperature region equal to or more than 500° C. is provided is that, in such temperature, those alloy layers are joined into an unitary form each other by solid phase diffusion at the same time of forming.

In the superplastic forming, a thin plate member is formed into a vessel shape. In the light of this, a superplastic blow forming method may be preferable wherein the thin plate is forced on inner circumference of mold or die by gas pressure to produce a desired shape. A gas having oxidizing property may preferably be used, for example, for imposing a forming pressure to produce an oxide film on the inside surface (cooking surface) of the container at the same time of forming. In this case, when oxygen gas is employed as an oxidizing gas, a partial pressure of the oxygen gas may be optionally selected, however preferably an extent of 0.001 to 0.1 atmosphere.

Instead of employing an oxidizing gas for forming the oxide film on the container, by dipping the container for which forming was completed into a suitable oxidizing solution or by anodizing the container in a suitable solution, such an oxide film can be also formed thereon.

In case where a whole container or part thereof comprises two or more laminated layers of one kind of titanium alloy or two or more kinds of titanium alloys, then the number of layers or each thickness of the layer are optional, any combination of a plurality of kinds of titanium alloys having different compositions are also optional matter.

It is of course that two or more layers of laminated titanium alloy layers having the same composition can be also used.

Instead of coating the inside surface of the container with an oxide film, needless to say, such surface may be preferably coated with the known film preventing scorch and stick such as a fluorocarbon resin film.

According to the invention, titanium alloy having a higher specific strength with graded corrosion-resistance is employed as a material of the electromagnetic cooking device container, occurrence of rust is suppressed even in long term use.

A considerably light weight is realized in comparison with the conventional container in case of forming a container having the same extent of strength and the same shape and dimension as the conventional container, Therefore in the whole container or a part of the container, for example, when a professional cooker uses the container made of titanium alloy in the long time for service and business, the cooker receives an extremely lower degree of fatigue and easy handling due to a light-weight of the container.

Since titanium alloy is of non-magnetic property, no distortion due to magnetostriction arises even in an intensive magnetic field, any deformation is prevented in the container using the titanium alloy.

In addition to the above, when a whole container or a part of the container comprises a structure formed of two or more titanium laminated alloy layers, each titanium alloy layer is in solid phase state and is formed each other completely into one unit, and even in different compositions, the same titanium is used as a basic material, this prevents almost all thermal expansion difference, and eliminates peeling on bonding surface of each layer.

Because of a high specific-resistance of titanium alloy, a depth of skin effect of eddy current generated in the alternating magnetic field (a largeness of current is equal to 1/e (=0.368) of the largeness in the surface, and proportional to a square of ½ of the specific resistance) comes deeper (this means a smaller skin effect and therefore a deep penetrated depth of the eddy current) and the container can be effectively heated by the electromagnetic induction.

A specific resistance value equal to or more than $80\times10^{-6}$ $\Omega\cdot$cm of each titanium alloy layer provides a sufficient heating value for cooking due to electromagnetic induction.

The titanium alloy formed on an inside surface of the container enables uniform heating on the entirety of the container depending on the magnetic field and prevents scorch and stick to the container (because the scorch and stick arise by partial heating).

Since coating of titanium oxide film on the inside surface of the container allows greasy and oily components to remain in the oxide film, this completely eliminates the scorch and stick.

A hot forming or superplastic forming at an temperature equal to or more than 500° C. at which the strength of titanium alloy varies smaller provides easily forming the plate materials made of titanium alloy into various desired shapes such as for pans, cooking skillets, and woks.

At the same time of forming, the titanium alloy layers of two or more laminated layers are securely joined with each other by solid phase diffusion.

The container having a lamination structure with titanium alloy layers facilitates scrapping process because of lamination of the titanium alloys each other even with difference compositions being employed.

BEST MODE FOR CARRYING OUT THE INVENTION

A feature of the present invention is described with respect to a first embodiment and a second embodiment and a comparison example, as follows.

First Embodiment

Each container of electromagnetic cooking devices produced in the first embodiment was allowed to have a container a whole of which comprises titanium alloy layers.

Table 1 shows each layer structure, the material of each layer, the thicknesses thereof, presence of an oxide film on the cooking surface, and a manufacturing method, in respect of 11 examples of containers (No. 1 to No. 11) produced as the first embodiment according to the present invention.

blow forming method in which a forming pressure is produced by gas pressure. In each of the containers Nos. 8, 9, 10, and 11, the titanium alloy layers have been incorporated with each other because of solid phase diffusion of the titanium alloy layers with each other being performed at the same time of the superplastic forming.

TABLE 1

| No. | First Layer | Second Layer | Third Layer | Presence of Oxide Film | Method of Manufacturing |
|---|---|---|---|---|---|
| First Embodiment | | | | | |
| 1 | Ti—8Al—1Mo—1V | — | — | No | Forming 750° C. |
| 2 | Ti—2Al | — | — | No | Forming 750° C. |
| 3 | Ti—3Al—2.5V | — | — | No | Superplastic Forming 900° C. |
| 4 | Ti—6Al—4V, 0.9 mm | — | — | No | Superplastic Forming 900° C. |
| 5 | Ti—6Al—4V, 0.9 mm | — | — | Yes | Superplastic Forming 900° C., Oxygen partial pressure 0.01 Atm |
| 6 | Ti—6Al—4V, 1.0 mm | Ti—3Al—2.5V, 0.5 mm | — | No | Forming 750° C. |
| 7 | Ti—6Al—4V, 0.5 mm | Ti—6Al—4V, 0.5 mm | — | No | Forming 500° C. |
| 8 | Ti—6Al—4V, 0.9 mm | Ti—5Al—5Sn—2Zr—2Mo—Si, 1.2 m | Ti—6Al—4V, 0.9 mm | No | SPF 880° C. |
| 9 | Ti—6Al—4V, 0.9 mm | Ti—5Al—5Sn—2Zr—2Mo—Si, 1.2 mm | Ti—6Al—4V, 0.9 mm | Yes | SPF 880° C., Oxygen partial pressure 0.05 Atm |
| 10 | Ti—6Al—4V, 0.5 mm | Ti—8Mn, 0.5 mm | Ti—6Al—4V, 0.5 mm | No | SPF 920° C. |
| 11 | Ti—6Al—4V, 0.5 mm | Ti—8Mn, 0.5 mm | Ti—6Al—4V, 0.5 mm | Yes | SPF 920° C. Oxygen partial pressure 0.01 Atm |

*SPF: a plurality of sheets are superposed and bonded at the time of superplastic forming.

As shown in Table 1, each container of Nos. 1 and 2 was made of only single titanium alloy layer produced by hot forming, each container of Nos. 3, 4, and 5 was made of only single titanium alloy layer produced by superplastic forming, each container of Nos. 6 and 7 was made of two layers of titanium alloy layers produced by hot forming, and each container of Nos. 8, 9, 10 and 11 was made of three layers of titanium alloy layers bonded and formed by SPF (a process for solid phase bonding at the same time of superplastic forming) (in Nos. 6 to 11, each of the first layers is the most outside layer, that is, has an outside surface of the container).

The specific resistance value of each titanium alloy layer of those layers was equal to or more than $80 \times 10^{-6}$ Ω·cm at an ordinary temperature. In concrete values, the specific resistance value of Ti-8Al-1Mo-1V was equal to $199 \times 10^{-6}$ Ω·cm, that of Ti-2Al was $82 \times 10^{-6}$ Ω·cm, that of Ti-6Al-4V was $171 \times 10^{-6}$ Ω·cm, that of Ti-3Al-2.5 V was $126 \times 10^{-6}$ Ω·cm, that of Ti-5Al-5Sn-2Zr-2Mo-Si was $171 \times 10^{-6}$ Ω·cm, and that of Ti-8Mn was $92 \times 10^{-6}$ Ω·cm, where Al, Mo, V, Sn, Zr, Si and Mn represent aluminum, molybdenum, vanadium, tin, zirconium, silicon, and manganese, respectively.

Each of the containers Nos. 1, 2, 6, and 7 was produced by placing the titanium alloy plate of each layer in Table 1 on a forming machine and press forming at a forming temperature shown in Table 1 under argon (Ar) gas atmosphere. In each of the containers Nos. 6 and 7, the laminated titanium alloy layers have been incorporated with each other because of solid phase diffusion bonding of the titanium alloy layers with each other being performed at the same time of the press forming.

In each of the containers Nos. 3, 4, 5, 8, 9, 10, and 11, for superplastic forming, there was employed a superplastic All the forming temperatures were equal to or more than 500° C., setting thereof was suitably executed depending on the kinds of the titanium alloys which were used. In concrete, the forming temperatures were 750° C. for each of the containers Nos. 1, 2, and 6, 900° C. for each of the containers Nos. 3, 4, and 5, 500° C. for each of the container No. 7, 880° C. for each of the containers Nos. 8 and 9, and 920° C. for each of the containers Nos. 10 and 11.

Further for each of the containers Nos. 5, 9, and 11, by using a gas mixture containing oxygen gas as a forming pressure gas for superplastic forming, an oxide film was formed on the inner surface (cooking surface) of the container at the same time of the forming.

A partial pressure of the oxygen gas at that time was of 0.01 atmosphere in each of the containers Nos. 5 and 11, and 0.05 atmosphere in the container No. 9.

Second Embodiment

In a container of an electromagnetic cooking device produced in the second embodiment, each bottom of the containers (a pan bottom or a pot bottom) comprises a structure of a titanium alloy layer, the side-surface (a pan wall or a pot wall) of the container is made of stainless steel, and the pan bottom and the pan wall are joined and unitarily formed.

Table 2 is prepared for the pan bottoms of containers (Nos. 12 to 14) produced in the second embodiment according to the invention, and shows each layer structure, material and thickness of each layer, presence of oxide film on the cooking surface, and a manufacturing method therefor.

TABLE 2

| No. | First Layer | Second Layer | Presence of Oxide Film | Method of Manufacturing |
|---|---|---|---|---|
| Second Embodiment | | | | |
| 12 | Ti—8Al—1Mo—1V, 0.9 mm | — | No | Forming 750° C. |
| 13 | Ti—2Al, 0.9 mm | — | No | Forming 750° C. |
| 14 | Ti—6Al—4V, 1.0 mm | Ti—3Al—2.5V, 0.5 mm | Yes | Superplastic Forming 900° C. Oxygen partial pressure 0.1 Atm |

As shown in the Table, each pan bottom of containers Nos. 12 and 13 was hot forged and made of only single titanium alloy layer, and the pan bottom of the container No. 14 was made of two layers of titanium alloy produced by superplastic forming (in No. 14, the first layer is the most outside layer, that is, an outside surface).

Each pan bottom of the containers Nos. 12 and 13 was produced by placing the titanium alloy plate shown in Table 2 on the forming machine and press forming it at the forming temperature shown in Table 2 under argon (Ar) gas atmosphere.

In the container No. 14, a pan bottom was produced by a superplastic blow forming in which forming pressure was given by gas pressure. Then, an oxide film was formed on the inside surface (cooking surface) of the pan bottom by using a gas mixture containing oxygen gas as a forming pressure gas, at the same time of the forming. Partial pressure of the oxygen gas was equal to 0.1 atmosphere.

The forming temperature for each pan bottom of the containers Nos. 12 and 13 was 750° C., and that for the pan bottom of the container No. 14 was 900° C.

Comparison Example

For comparison, four examples of containers Nos. 15 to 18 are produced, where each container for an electromagnetic cooking device produced in each comparison example has the same layer structure in the entirety thereof.

Table 3 shows a material, a surface treatment on a cooking surface, and remarks, for each comparison example.

TABLE 3

| No | Material | Surface Treatment | Remarks |
|---|---|---|---|
| Comparison Example | | | |
| 15 | Pure Ti | — | |
| 16 | Fe | — | Sufficiently Familiarized by Cooking Oil |
| 17 | SUS430 + Al Alloy as Most Outside Layer | Fluoro-carbon Resin Treatment | |
| 18 | SUS430 + Al Alloy + SUS304L | — | |

As shown in the Table, the container No. 15 is made of only pure Ti, the container No. 16 is made of only iron (Fe) similarly to a conventional container, the container No. 17 is made of a conventional clad material which is superposed with a stainless steel (SUS 430) as the most outside layer (outside surface of the container) and an aluminum (Al) alloy on the inside thereof, and the container No. 18 is made of a conventional clad material having a stainless steel (SUS 304L) further arranged on the inside of the container No. 17.

Each specific resistance of the materials in the above described comparison example is as follows. The specific resistance of the Ti was $(47 \text{ to } 55) \times 10^{-6}$ $\Omega \cdot \text{cm}$, that of the Fe was $9.8 \times 10^{-6}$ $\Omega \cdot \text{cm}$, that of SUS430 was $60 \times 10^{-6}$ $\Omega \cdot \text{cm}$, that of the Al alloy is $5.8 \times 10^{-6}$ $\Omega \cdot \text{cm}$, and that of SUS304L was $72 \times 10^{-6}$ $\Omega \cdot \text{cm}$.

To prevent the scorch and stick to the container, a surface treatment, i.e., a known fluorocarbon resin treatment, was carried out on the cooking surface of only the container No. 17, and in the container No. 16, the cooking surface was sufficiently familiarized with cooking oil, instead of the surface treatment.

Evaluation

Using 18 container examples of Nos. 1 to 18, 200 times of omelet cooking have been performed by the electromagnetic cooking device with 2 kW capacity. Thereafter, an evaluation is performed for heating state, damage of the container, deformation of the container, extent of fatigue of the cooker due to the weight, corrosion resistance, and scorch and stick. The result of the evaluation is shown in Table 4.

TABLE 4

| No | Heating State | Damage | Deformation | Degree of Fatigue | Corrosion Resistance | Scorch and Stick |
|---|---|---|---|---|---|---|
| First Embodiment | | | | | | |
| 1 | (O) | (O) | (O) | (O) | (O) | O |
| 2 | (O) | (O) | (O) | (O) | (O) | O |
| 3 | (O) | (O) | (O) | (O) | (O) | O |
| 4 | (O) | (O) | (O) | (O) | (O) | O |
| 5 | (O) | (O) | (O) | (O) | (O) | (O) |
| 6 | (O) | (O) | (O) | O | (O) | O |
| 7 | (O) | (O) | (O) | (O) | (O) | O |
| 8 | (O) | (O) | (O) | O | (O) | O |
| 9 | (O) | (O) | (O) | O | (O) | (O) |
| 10 | (O) | (O) | (O) | (O) | (O) | O |
| 11 | (O) | (O) | (O) | (O) | (O) | (O) |
| Second Embodiment | | | | | | |
| 12 | (O) | O | O | O | (O) | O |
| 13 | (O) | O | O | O | (O) | O |
| 14 | (O) | O | O | O | (O) | (O) |
| Comparison Example | | | | | | |
| 15 | X | — | — | — | — | — |
| 16 | (O) | O | X | X | O | (O) |
| 17 | (O) | X | Δ | X | (O) | (O) |
| 18 | (O) | X | X | X | (O) | Δ |

In the Table, (o) mark designates that 200 times of cooking were performed without problem and yet thereafter continuous cooking were also available. o mark designates that 200 times of cooking were performed with a few small problems and yet thereafter continuous cooking were available. Δ mark designates that 200 times cooking were achieved by all means, but thereafter repeat cooking was unavailable, and x mark designates that cooking is difficult from the first or a failure due to peeling or the like arises in cooking function before reaching the 200th cooking.

As apparent from Table 4, for heating state and corrosion resistance, each example of Nos. 1 to 14 could be used for cooking exceeding 200 times without problem.

For damage and deformation, each of the examples Nos. 1 to 11 could be used even in cooking exceeding 200 times without problem, each of the examples Nos. 12 to 14 provided some problems in 200 times of cooking but thereafter continuous cooking was available, For fatigue, each of the examples Nos. 1, 2, 3, 4, 5, 7, 10, and 11 could be used without problem even in cooking exceeding 200 times, and each of the examples Nos. 6, 8, 9, 12, 13, and 14 could be used in cooking exceeding 200 times but some troubles arose because of the examples having a little thicker thickness.

For scorch and stick, each of the examples Nos. 1 to 14 was good, in particular, each of the containers Nos. 5, 9, 11, and 14 having an oxide film were very good. In Nos. 12, 13, and 14, with titanium alloy layers only on their pan bottoms, scorch and stick were prevented by the titanium alloy layers on the heating portions (pan bottoms) which was conventionally apt to scorch and stick, and therefore satisfactory results were obtained.

On the contrary, a container, for which all the evaluation items were substantially satisfied, was not found in each of the comparison examples Nos. 15 to 18.

In particular, it was impossible to perform an induction heating by using the container No. 15 because of its lower specific resistance, i.e., $(47 \text{ to } 55) \times 10^{-6}$ $\Omega \cdot cm$. Consequently, the container No. 15 could not be used from the first. The container No. 16 had a larger deformation due to magnetostriction, and the containers Nos. 17 and 18 were considerably damaged because of deformation or peeling between the layers, thus, any of the containers Nos. 16–18 were not practical.

According to the comparison results shown and described above, it is found that each of the containers Nos. 1 to 14 is extremely upgraded in all items, in comparison with the conventional containers which are shown as comparison examples Nos. 16 to 18.

The present invention is not limited in compositions of the titanium alloys, and in combinations of the number of layers or in combinations of the kinds of alloys in cases of laminated construction with two or more layers of titanium alloy.

In case of a part of the container having a structure made of titanium alloy layer, in the second embodiment, the pan bottom comprises a titanium alloy layer, the pan wall comprises stainless steel, and the pan bottom and the pan wall are joined and incorporated with each other. However the present invention is not limited to this. The present invention requires that a structure comprising a titanium alloy layer are used for a part of the container, for example, the bottom is made of stainless steel and the pan walls comprises titanium alloy layer and the like. However, the position on which a titanium alloy layer is to be used, and the material to be used for positions other than those on which a titanium alloy layer is used, are not limited.

According to the container of the electromagnetic cooking device of the present invention, in effect, the use of titanium alloy having a specific resistance value equal to or more than $80 \times 10^{-6}$ $\Omega \cdot cm$ as a material of the containers, provides graded corrosion-resistance, prevents scorch and stick, deformation due to magnetostriction and peeling on bonding surface of laminated layers with each other, in addition, obtains sufficient amount of heat for cooking by electromagnetic induction, and provides light weight.

The titanium alloys are easily obtained in the market as long as its specific resistance value is equal to or less than $200 \times 10^{-6}$ $\Omega \cdot cm$.

In advantages, the cooker hardly suffers fatigue even if cooking by using the container of the invention in a long time, moreover, the container exhibits satisfactory effects which can withstand for the long year practical use, therefore, such effects on practical use are extremely large.

Since the method of manufacturing an electromagnetic cooking device according to the present invention, utilizes a hot forming or a superplastic forming at forming temperature equal to or more than 500° C. in order to easily mold the container into a desired shape, the container having an upgraded characteristic can be readily formed. Particularly, the use of the superplastic forming is capable of forming with ease even for a thin-thickness large-drawing shape which is hardly formed by the ordinary deep drawing or the like.

Industrial Applicability

As hereinbefore fully described, the present invention is effectively applicable for manufacturing an electromagnetic cooking device container preventing deformation thereof and peeling on bonded interface between the different kind metals even in repeat use, an electromagnetic cooking device container having a high heating efficiency by electromagnetic induction and a graded corrosion-resistance, and an electromagnetic cooking device container which is easily handled with light weight.

We claim:

1. A container of an electromagnetic cooking device comprising a non-magnetic titanium alloy plate which has a resistivity which is not less than $80 \times 10^{-6}$ $\Omega \cdot cm$ and is not more than $200 \times 10^{-6}$ $\Omega \cdot cm$ and has a desired shape formed by a superplastic blow forming method in which the titanium alloy plate is forced on a surface of a mold or die by a gas pressure at a forming temperature not less than 500° C.

2. A container as claimed in claim 1, wherein the titanium alloy plate comprises a plurality of laminated titanium alloy layers.

3. A container as claimed in claim 2, wherein the titanium alloy plate comprises a plurality of kinds of titanium alloy layers.

4. A container as claimed in claim 2, wherein the whole container comprises the titanium alloy plate.

5. A container as claimed in claim 2, wherein a portion of the container comprises the titanium alloy plate throughout the portion in the thickness direction.

6. A container as claimed in claim 2, further comprising a titanium oxide film formed on an inner cooking surface of the formed titanium alloy plate.

7. A container as claimed in claim 1, wherein the whole container comprises the titanium alloy plate.

8. A container as claimed in claim 1, wherein a portion of the container comprises the titanium alloy plate throughout the portion in the thickness direction.

9. A container as claimed in claim 1, further comprising a titanium oxide film formed on an inner cooking surface of the formed titanium alloy plate.

10. A container as claimed in claim 1 further comprising a titanium oxide film formed on an inner cooking surface of the formed titanium alloy plate, which is formed by using a mixed gas of inert gas or oxidizing gas for applying the pressure.

11. A container as claimed in claim 1, wherein the titanium alloy plate contains from about 85 to 98 weight percent titanium.

12. A method of manufacturing a container of an electromagnetic cooking device comprising the steps of:

preparing a non-magnetic titanium alloy plate having a resistivity which is not less than $80 \times 10^{-6}$ $\Omega \cdot$cm and is not more than $200 \times 10^{-6}$ $\Omega \cdot$cm; and forming the titanium alloy plate into a desired shape by a superplastic blow forming method in which the titanium alloy plate is forced on a surface of a mold or die by a gas pressure at a forming temperature not less than 500° C.

13. A method as claimed in claim 12, wherein the titanium alloy plate comprises a single titanium alloy layer or a plurality of laminated titanium alloy layers.

14. A method as claimed in claim 13, wherein the titanium alloy plate comprises a plurality of kinds of titanium alloy layers.

15. A method as claimed in claim 12, wherein the pressure is applied by a gas having oxidizing property.

16. A method as claimed in claim 12, wherein the gas pressure is in the range of 0.1–100 atmosphere.

17. A method as claimed in claim 12, wherein the titanium alloy plate contains from about 85 to 98 weight percent titanium.

* * * * *